(12) United States Patent
Paoli et al.

(10) Patent No.: US 7,065,204 B2
(45) Date of Patent: Jun. 20, 2006

(54) METHOD FOR TRANSMITTING CHARGING SIGNALS VIA A DATA TRANSMISSION PATH USING RESONANCE PHENOMENA

(75) Inventors: Gerhard Paoli, Villach (AT); Dietmar Straussnigg, Villach (AT)

(73) Assignee: Infineon Technologies AG, Munich (DE)

( * ) Notice: Subject to any disclaimer, the term of this patent is extended or adjusted under 35 U.S.C. 154(b) by 430 days.

(21) Appl. No.: 10/246,321

(22) Filed: Sep. 18, 2002

(65) Prior Publication Data

US 2003/0068050 A1 Apr. 10, 2003

(30) Foreign Application Priority Data

Sep. 25, 2001 (DE) .................. 101 47 082

(51) Int. Cl.
  *H04M 1/00* (2006.01)

(52) U.S. Cl. .................. 379/377; 379/388; 379/348

(58) Field of Classification Search ................ 379/377, 379/348, 386
See application file for complete search history.

(56) References Cited

U.S. PATENT DOCUMENTS

| 5,862,213 A * | 1/1999 | Klamt et al. ................ 379/413 |
| 2001/0019608 A1 | 9/2001 | Lofmark |
| 2003/0086502 A1* | 5/2003 | Paoli et al. ................ 375/257 |

FOREIGN PATENT DOCUMENTS

| CH | 662 024 A5 | 8/1987 |
| GB | 2 149 618 A | 6/1985 |
| WO | WO 01/67735 A1 | 9/2001 |

* cited by examiner

*Primary Examiner*—Jefferey F. Harold
(74) *Attorney, Agent, or Firm*—Jenkins, Wilson, Taylor & Hunt, P.A.

(57) ABSTRACT

Method for transmitting charging signals via a data transmission path using resonance phenomena The invention provides a method for transmitting charging signals, in which an electrical resonance effect is provided, with an output current (100) being emitted from a line current driver device (202), which output current (100) is passed through a data path filter block (201), which has a data transmission path unit (122) and a matching filter unit (123), to a line impedance (102), and the matching filter unit (123) and the data transmission path unit (122) are set such that an electrical resonance effect occurs, which leads to a voltage peak occurring in a line voltage level (101).

8 Claims, 2 Drawing Sheets

METHOD FOR TRANSMITTING CHARGING SIGNALS VIA A DATA TRANSMISSION PATH USING RESONANCE PHENOMENA

DESCRIPTION

Method for transmitting charging signals via a data transmission path using resonance phenomena

1. Technical Field

The present invention relates in general to a method for transmitting charging signals via a data transmission path, and relates in particular to a method for transmitting charging signals, in which electrical resonance effects are used for adaptation of a voltage level.

2. Background Art

Many different methods have been used for transmitting data via conventional telephone lines, for example via conventional double-cored copper cables, and these are referred to as DSL (digital subscriber line) methods.

An asymmetric DSL method (ADSL=asymmetric digital subscriber line) is particularly widely used, in which matching filter units, also referred to as splitter filters, are used at the exchange end and subscriber end, in order to separate conventional telephony (POT=plain old telephony) and ADSL applications for data transmission.

In the asymmetric DSL method, data is transmitted asymmetrically, that is to say at different speeds depending on the direction. Data is typically transmitted at a data transmission rate of 8 Mbit/s from a switching center to a subscriber point, while data is transmitted from a subscriber end to an exchange end (upstream) at a maximum of 1 Mbit/s.

It should be mentioned that the data transmission rate of both downstream and upstream is dependent on the line length. One major advantage of using ADSL methods is that existing cable networks, for example double-cored copper lines, conventional telephone lines, etc., can still be used for data transmission.

In order to charge or bill for telephone calls when using data transmission lines, so-called charging signals are transmitted at specific frequencies, typically at frequencies of 16 kHz or 12 kHz from the switching center to the subscriber point.

In this case, voltage levels within permissible tolerances are specified for the charging signals, and these may vary between different countries. In the process, it should be noted that the required voltage levels for the charging signals (also referred to as teletax signals) must be designed to be independent of the respective line impedance of a data transmission path unit (telephone line).

In the case of ADSL methods via conventional telephone lines, the voltage drop across series impedances which are formed, for example, from a series resistance element in series with a series reactive element, is disadvantageously not negligible.

A further disadvantage is that a high line voltage level that is required specifically for one country and may be in the region of 5 volts across a line impedance [lacuna] considerable restrictions on the design of matching filter units (so-called splitter filters).

In the case of a high inductance being introduced as the series reactive element into the matching filter unit, the required line voltage level across the line impedance may disadvantageously not be feasible owing to a drive limit of a subscriber line interface circuit (SLIC). This problem is worse in the case of a low-impedance line termination, for example 220 Ohms. High inductances as series reactive elements, that is to say "large" matching filter units or splitter filters, are, however, expedient or required for various reasons, the major reasons being quoted in the following text:

(i) minimizing impedance changes when switching between operating modes;
(ii) reducing power losses in the subscriber line interface circuits; and
(iii) reducing the noise component in the transmission path.

SUMMARY OF THE INVENTION

One object of the present invention is thus to provide a method for transmitting charging signals, in which a required line voltage level is maintained with predetermined matching filter units.

According to the invention, this object is achieved by the method specified in patent claim 1, and by an apparatus having the features of patent claim 6.

Further refinements of the invention can be found in the dependent claims.

One major idea of the invention is to make use of electrical resonance effects which occur between a data transmission path unit and the at least one matching filter unit. According to the invention, an external circuit which is formed from the at least one matching filter unit (also referred to as a splitter filter) and a data transmission path unit (in particular an "ADSL data path") is designed such that it forms a tuned circuit for a specific frequency, in particular for the frequency at which charging signals are to be transmitted (16 kHz or 12 kHz).

This advantageously allows an adequate voltage peak or an adequate increase in the line voltage level to be achieved even if the drive level of a subscriber line interface circuit is low.

The method according to the invention for transmitting charging signals, in which an electrical resonance effect is provided, essentially has the following steps:

a) emission of an output current from a line current driver device;

b) passing the output current through a data path filter block, which has a data transmission path unit and a matching filter unit, to a line impedance, on which an adequate line voltage level is advantageously produced; and c) setting the matching filter unit and/or the data transmission path unit such that an electrical resonance effect occurs, which advantageously leads to voltage matching or a voltage peak being produced in a line voltage level.

The dependent claims contain advantageous developments and improvements of the respective subject matter of the invention.

According to one preferred development of the present invention, a circuit in the line current driver device is designed such that circuit components of the data [lacuna] path unit and of the matching filter unit form a series tuned circuit. An electrical resonance effect in this case preferably occurs at frequencies at which charging signals are transmitted.

According to a further preferred development of the present invention, a circuit in the line current driver device is designed such that circuit components of the data [lacuna] path unit and of the matching filter unit form a parallel tuned circuit.

An electrical resonance effect preferably occurs in an advantageous manner at frequencies at which the charging signals are transmitted.

According to yet another preferred development of the present invention, the resonance effect produces a voltage peak across a line impedance.

The apparatus according to the invention for transmitting charging signals also has:

a) a line current driver device for emission of an output current; and
b) a data path filter block through which the output current is passed to a line impedance, and which has a data transmission path unit and a matching filter unit.

BRIEF DESCRIPTION OF THE DRAWINGS

Exemplary embodiments of the invention will be explained in more detail in the following description, and are illustrated in the drawings, in which.

DETAILED DESCRIPTION OF THE INVENTION

In the figures, identical reference symbols denote the same or functionally identical components or steps.

Figure 1:
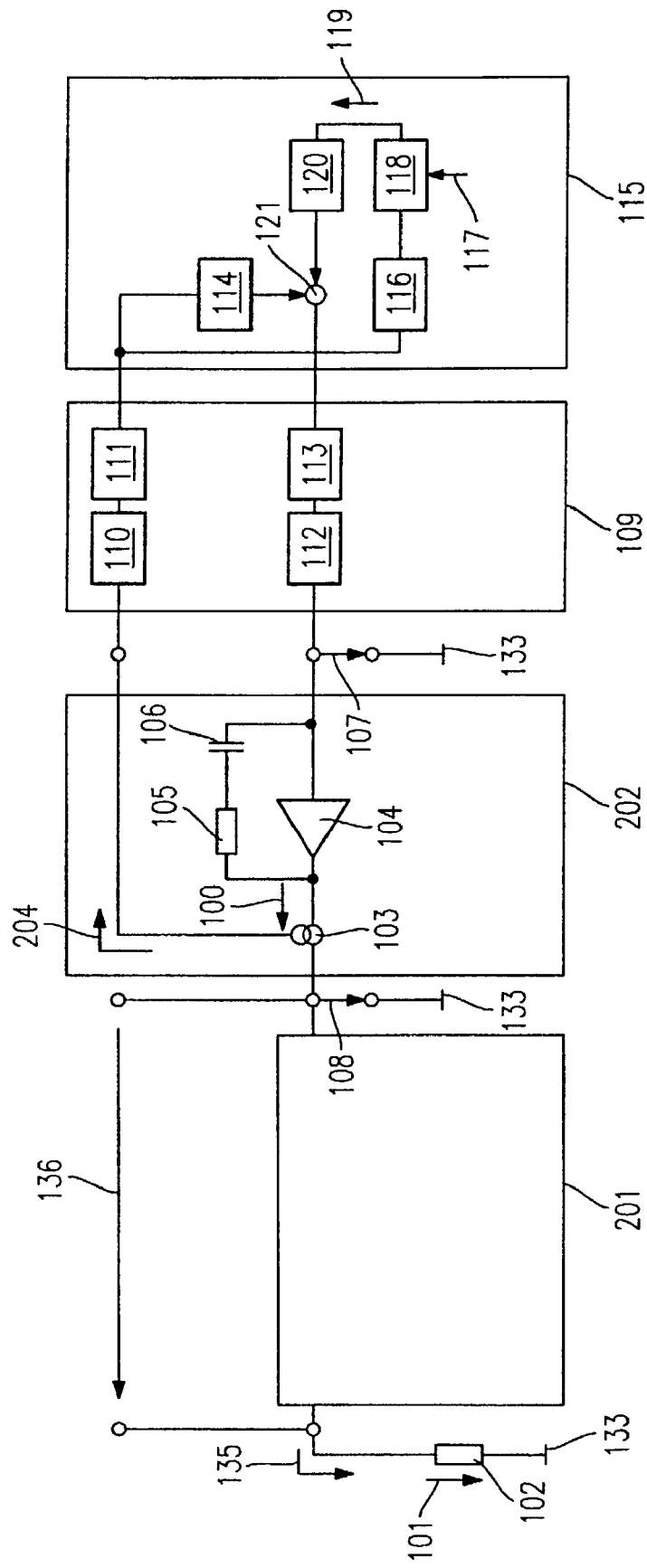
FIG. 1 shows a block diagram of one preferred exemplary embodiment of a circuit arrangement for transmitting charging signals.

The circuit arrangement which is illustrated in FIG. 1 shows, schematically, a data path filter block 201 to which a driver output voltage level 108 is applied, between an output of a line current driver device 202 and a ground connection 133.

The output of the data path filter block 201 is connected to a line impedance 102, which represents the line, and across which the line voltage level is provided, between an output connection of the data path filter block 201 and a ground connection 133. An overall voltage drop between an input connection of the data path filter block 201 and an output connection of the data path filter block 201, referred to by the reference symbol 136 in FIG. 1, contributes to reducing the driver output voltage level 108, so that a lower line voltage level 101 is obtained.

According to the invention, use is now made of a resonance effect within the data path filter block 201 in order to produce a voltage peak at the output of the data path filter block 201. In particular, a series tuned circuit is provided, and is formed from circuit components of the data transmission path unit 122 and of the matching filter unit 123. A line series current 135 which flows through the line impedance 102 corresponds to an output current 100 from the line current driver device 202.

The line current driver device 202 will be explained in more detail in the following text. The major component of the line current driver device is an amplifier unit 104, which may, for example, be in the form of an operational amplifier. A current detection unit 103 is arranged at the output of the amplifier unit 104, and supplies a current signal 204 which corresponds to the output current 100, thus providing precise detection of the output current 100.

The current detection unit 103 may, for example, be in the form of a Hall sensor. Furthermore, the current detection unit 103 may be provided by a shunt resistance element, with a tap at the connections of the shunt resistance element providing a voltage drop which is proportional to the output current, and which can be used as a current signal 204. The current signal 204 is supplied to an output connection of the line current driver device 202, as a result of which the current signal 204 can be supplied to an input connection of the filter device 109.

As is shown in the block diagram of the circuit arrangement for transmitting charging signals, the amplifier unit 104 may have a feedback path, comprising a feedback resistance element 105 and a feedback reactive element 106. It should be mentioned that at least one feedback resistance element 105 and at least one feedback reactive element 106 of the amplifier unit 104 of the line current driver device 202 may be in the form of synthesized feedback impedance.

Furthermore, the feedback resistance element 105 and the feedback reactive element 106 in the feedback path of the amplifier unit 104 may be either in the form of passive elements (such as resistance elements R, inductive reactive elements L and capacitive reactive elements C) or in the form of active elements.

The circuit components of the data transmission path unit 122 and of the matching filter unit 123 will be explained in more detail in the following text with reference to FIG. 2. In the illustrated exemplary embodiment of the present invention, the matching filter unit 123 comprises a series impedance, which is formed by a series resistance element 124 and a series reactive element 125, in the illustrated case a series reactive inductance while, in contrast, a parallel impedance is formed from a parallel resistance element 126 and a parallel reactive element 127, in this case a parallel capacitance.

The series impedance is arranged between an input connection and an output connection of the matching filter unit 123, while the parallel resistance is arranged between the input connection and a ground connection 133. The currents which occur in the matching filter unit 123, that is to say a filter series current 131 and a filter parallel current 132, in total form the output current 100 of the line current driver device 202, while the variables of the filter series current 131 and the filter parallel current 132 depend on the switching elements 124, 125, 126 and 127 in the matching filter unit 123. The output connection of the matching filter unit 123 is connected to an input connection of the data transmission path unit 122.

A parallel current once again occurs in the data path transmission [sic] unit, referred to as a line parallel current 134, so that the filter series current 131 flowing through the matching filter unit 123 is modified to the line series current 135 mentioned above, such that the filter series current 131 forms the sum of the line parallel current 134 and of the line series current 135.

The line series current 135 flows through the line impedance 102, which has already been described with reference to FIG. 1, thus resulting in a voltage drop across the line impedance, that is to say producing a line voltage level 101, which can be tapped off between an output connection of the data transmission path unit 122 and the ground connection 133.

Figure 2:
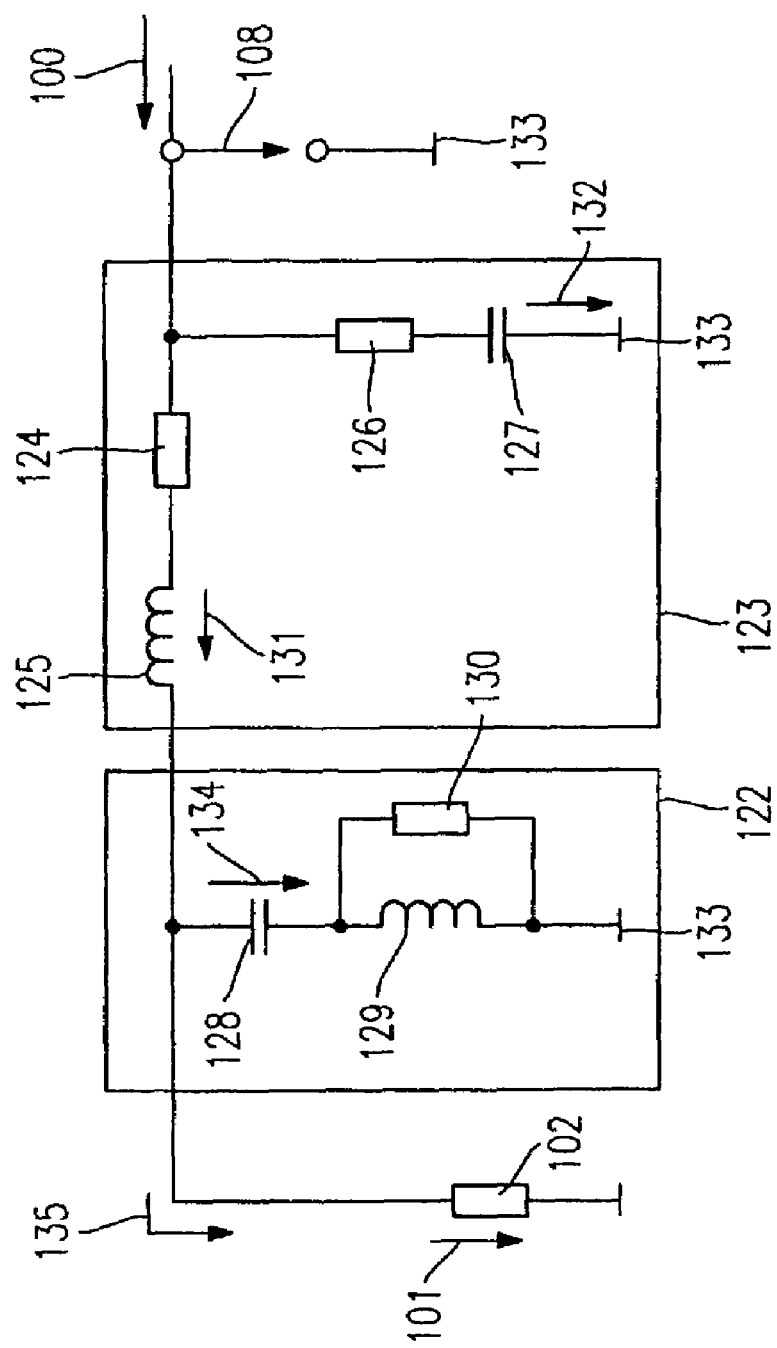
FIG. 2 shows an arrangement of circuit components for the data path filter block shown in FIG. 1, in greater detail.

As illustrated in FIG. 2 and described above, the driver output voltage level 108 provided by the line current driver device 202 is reduced by the overall voltage drop 136, which is dropped across the series circuit formed from the data transmission path unit 122 and the matching filter unit 123.

The line parallel current 134 flows from the input connection of the data transmission path unit 122, via a data transmission path capacitance 128 and a parallel circuit formed from a data transmission path inductance 129 and a data transmission path resistance 130, to the ground connection 133.

According to the invention, the circuit components of the data transmission path unit 122 and of the matching filter unit 123 are designed such that an electrical resonance effect occurs between the circuit components of the data transmission path unit 122, that is to say the series resistance element 124, the series reactive element 125, the parallel resistance element 126 and the parallel reactive element 127 on the one hand, and the data transmission path capacitance 128, the data transmission path inductance 129 and the data transmission path resistance 130.

In the illustrated exemplary embodiment of the present invention, the circuit components which have been mentioned above form a series tuned circuit. The series reactive element 125 of the matching filter unit 123, which is in the form of an inductance, may in this case be formed by the apparatus according to the invention as a high inductance, as is advantageous when the intention is to minimize the impedance changes during mode changes, when power losses from subscriber line interface circuits must be limited, and when a noise component must be reduced in a data transmission path.

The present invention avoids the disadvantage of a large voltage drop across the series reactive element 125 by producing a voltage peak by means of an electrical resonance effect.

The circuit blocks 109 and 115 which are illustrated in FIG. 1, that is to say the filter device 109 and the regulation device 115, will be described in more detail in the following text.

The regulation device 115 operates as a digital regulation device, while all the other circuit components, including the filter units 110, 112, operate in the analog domain. It can clearly be seen that analog/digital conversion of signals which are passed from the filter device 109 to the regulation device 115 is required in an analog/digital converter 111.

Conversely, signals which are passed from the regulation device 115 to the filter device 109 must be converted from the digital domain to the analog domain in a digital/analog converter 113.

The current signal 204 is supplied via the input connection of the filter device 109 to an input filter unit 110, which acts as an anti-aliasing filter, with the output signal from the input filter unit 110 being supplied to the analog/digital converter 111. The digitized output signal from the analog/digital converter 111 is supplied to a digital filter unit 114 and to a determination unit 116.

Since charging signals are conventionally at a fixed frequency which can be predetermined, for example at 16 kHz or 12 kHz, and, furthermore, are sinusoidal, the transfer function of the digital filter unit 114 may be represented by a single complex number, which is multiplied in a multiplication unit 121 by an output signal from a control unit 120.

The transfer function of the at least one data transmission path is determined in the determination unit 116 for the at least one frequency at which the charging signals are to be transmitted from a switching center to a subscriber point.

The output signal from the determination unit 116 is supplied to a nominal value comparison unit 118, in which a nominal value 117 may be entered, so that a control signal 119 can be produced as the output signal from the nominal value comparison unit 118, corresponding to a difference that is to be regulated out between the nominal value 117, which can be predetermined, and the actual signal determined by the determination unit 116.

The control signal 119 is supplied to the control unit 120, so that, after multiplication by the output signal from the digital filter unit 114, an output signal is produced from the regulation device 115. The digital output signal from the regulation device 115 is supplied to the digital/analog converter 113 of the filter device 109, in order to obtain an analog signal which is proportional to the digital output signal from the regulation device 115, and which is supplied to an output filter unit 112 of the filter device 109.

Filtering in the output filter unit 112 of the filter device 109 is used to filter out oversampled components which are outside a transmission band of a transmission frequency range. The filtered signal is emitted from the filter device 109 as a driver input voltage level 107, which can be tapped off between an output connection of the filter device 109 and the ground connection 133, and is supplied to the line current driver device 202.

Since, according to the invention, the driver output voltage level 108 which is emitted from the line current driver device 202 is no longer simply reduced by the voltage division that is caused in the data path filter block 201, as in conventional methods for transmitting charging signals, but, instead of this, a voltage peak is provided by means of an electrical resonance effect between the data transmission path unit 122 and the matching filter unit 123, this advantageously allows a high inductance to be used as the series reactive element 125 in the matching filter unit 123.

Furthermore, an electrical resonance effect between the data transmission path unit 122 and the matching filter unit 123 can be provided by means of a parallel tuned circuit, this likewise resulting in a voltage peak with respect to the driver output voltage level 108.

It should furthermore be noted that the frequencies at which an electrical resonance effect occurs in a series tuned circuit or in a parallel tuned circuit, which are each formed by circuit components of the data transmission path unit 122 and of the matching filter unit 123, lie in a range in which charging signals are typically transmitted via conventional telephone lines, that is to say the frequencies are expediently 16 kHz or 12 kHz.

Although the present invention has been described above on the basis of preferred exemplary embodiments, it is not restricted to these exemplary embodiments, but can be modified in a wide range of ways.

What is claimed is:

1. A method for transmitting charging signals, in which an electrical resonance effect is provided, the method comprising:
   a) emitting an output current from a line current driver device;
   b) passing the output current through a data path filter block, which has a data transmission path unit and a matching filter unit, to a line impedance; and
   c) setting the matching filter unit and the data transmission path unit such that a series tuned circuit is formed and an electrical resonance effect occurs, which leads to a voltage peak being produced in a line voltage level, wherein a circuit in the line current driver device is provided such that circuit components of the data transmission path unit and of the matching filter unit form a parallel tuned circuit.

2. The method as claimed in claim 1, wherein the resonance effect occurs at at least one frequency at which the charging signals are transmitted.

3. The method as claimed in claim 1, comprising providing a circuit in the line current driver device such that circuit components of the data transmission path unit and of the matching filter unit form a series tuned circuit.

4. The method as claimed in claim 1, wherein the resonance effect results in voltage matching.

5. An apparatus for transmitting charging signals, with an electrical resonance effect occurring, the apparatus comprising:
  a) a line current driver device for emission of an output current; and
  b) a data path filter block through which the output current is passed to a line impedance, and which comprises a data transmission path unit and a matching filter unit, wherein the matching filter unit and the data transmission path unit form a series tuned circuit and are set such that an electrical resonance effect occurs, which leads to a voltage peak being produced in a line voltage level, wherein circuit components of the data transmission path unit and of the matching filter unit form a parallel tuned circuit.

6. The apparatus as claimed in claim 5, wherein the matching filter unit has at least one high inductance.

7. The apparatus as claimed in claim 5, wherein a feedback resistance element and/or a feedback reactive element of an amplifier unit in the line current driver device are in the form of a synthesized feedback impedance.

8. The apparatus as claimed in claim 5, wherein the tuned circuit which is formed from circuit components of the data transmission path unit and of the matching filter unit has a resonant frequency at 16 kHz or 12 kHz.

* * * * *